United States Patent Office 3,428,559
Patented Feb. 18, 1969

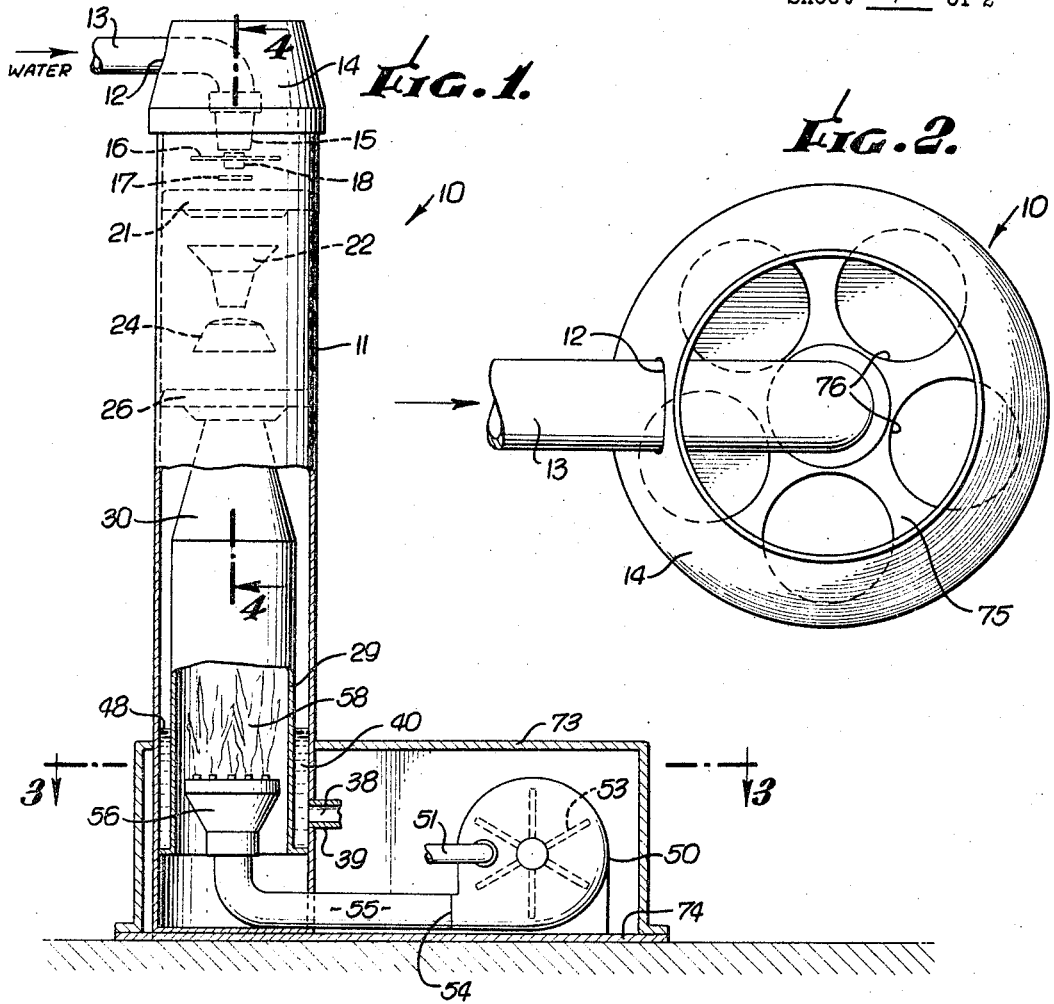
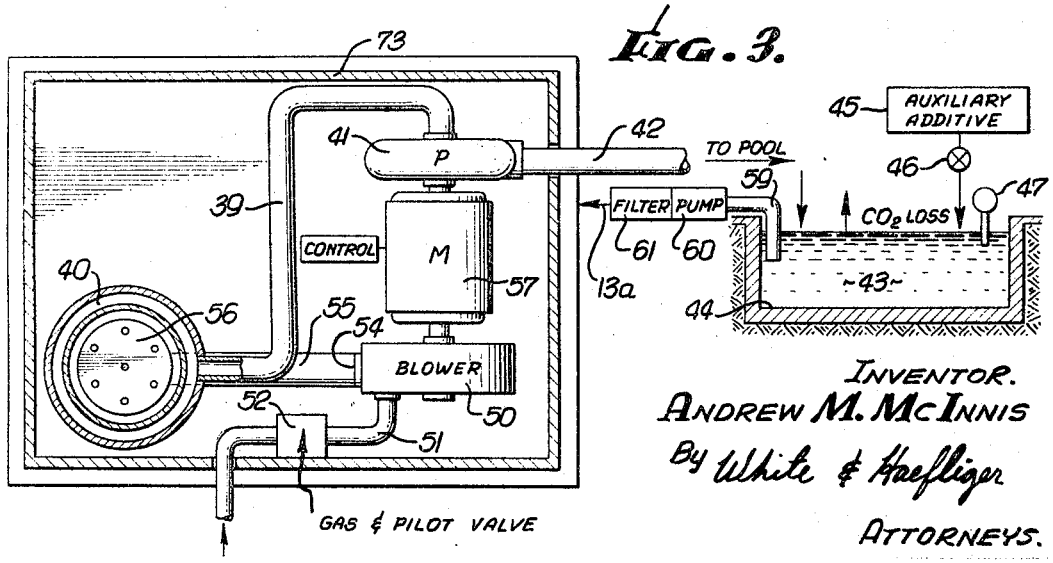

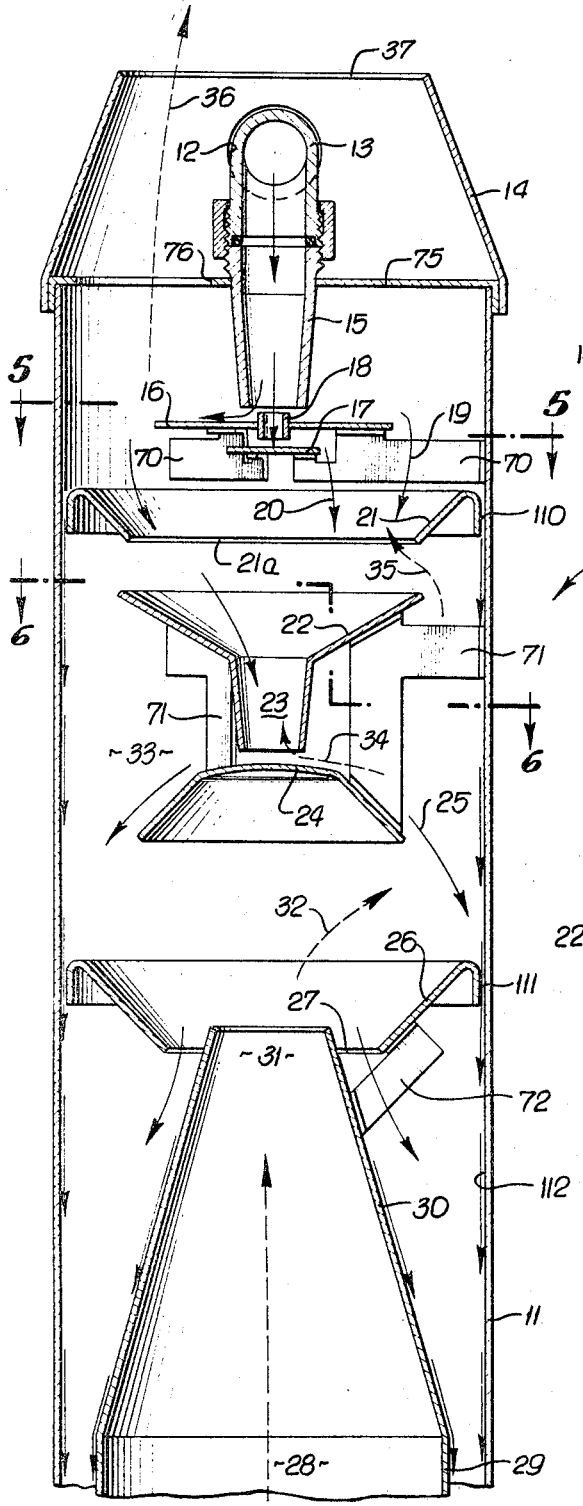
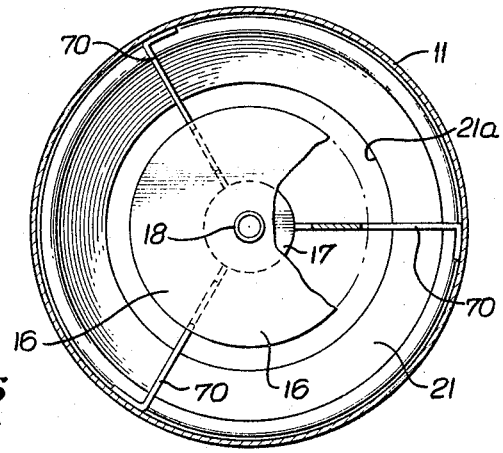
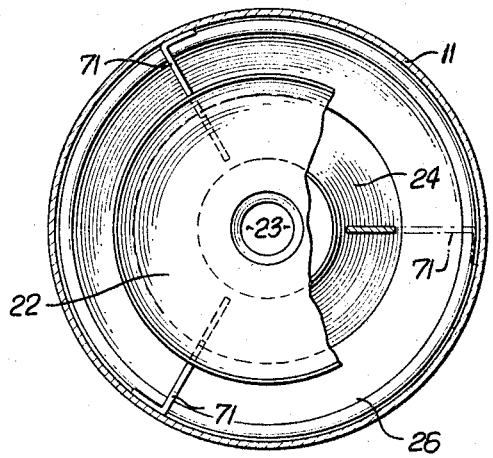

3,428,559
APPARATUS AND METHOD FOR TREATING
SWIMMING POOL WATER
Andrew M. McInnis, Covina, Calif., assignor to Ballard
 & Associates Inc., Pasadena, Calif., a corporation of
 California
Filed Oct. 14, 1966, Ser. No. 586,847
U.S. Cl. 210—60                                    11 Claims
Int. Cl. C02b 1/18

ABSTRACT OF THE DISCLOSURE

The disclosure concerns apparatus and method for heating and controlling swimming pool water, using hot gaseous products of combustion.

---

This invention relates generally to water treatment, and more specifically concerns heating and treating water with products of combustion, to derive particularly advantageous results in the case of swimming pool water.

It is a major object of the invention to provide improvements in water heating method and apparatus wherein water is cascaded in direct contact with hot gaseous products of combustion for heating and treating the water, and so as to control its temperature and pH in a particularly desirable manner. As will be seen, other objects include the elimination or reduction of algae growth in water as for example in swimming pools, substantially reduced need for addition of chlorine to swimming pools, adaptation of the apparatus to existing swimming pool water circulation systems in such manner that the pool water recirculation may continue whether or not the water is being heated and treated, elimination of problems associated with pressure forcing products of combustion into a body of water exerting a head which must be overcome by the pressure, and particularly advantageous features of construction and mode of operation of the treatment apparatus.

Basically, the apparatus is adapted for combination with a pool of water, and includes an upright container outside the pool water and having an inlet to receive a stream of pool water and interior baffles to drain and produce muleiple cascades of falling water wtihin the container, the container also having a zone to receive a hot gaseous stream of combustion products including carbon dioxide, the zone and container having outlets to pass the exhaust gas stream so that it rises in countercurrent contacting relation to the cascading water and in successive passes through the cascades so that the water becomes heated and also absorbs sufficient carbon dioxide for raising the relative acidity of the water to control algae growth in the pool, and the container also having a water outlet to pass heated water for return to the pool. Additional features of the invention's apparaus aspects include the provision of ducting to pass pool water to the container inlet and to return water from the water outlet to the pool, as for example a swimming pool; the provision of a blower connected to displace combustible gas into the container for combustion in a zone therein and pressurized flow through the water cascades; the provision of a tubular baffle in the container to define a combustion zone and other baffles staggered vertically above the tubular baffle outlet to produce multiple cascades in the path of lateral and upward flow of gas; the provision of a pump to draw water collecting in the container to prevent flooding thereof; and the provision of a prime mover connected to drive the blower and pump continuously, and a control to meter gas delivery to the gas receiving zone in the container.

In its method aspects, the invention includes the steps of withdrawing water from the pool, cascading the withdrawn water outside the pool, passing gaseous products of combustion through the cascading water to dissolve carbon dioxide, and returning the carbon dioxide containing water to the pool. Additional steps include combusting the combustible to produce heated products of combustion for heating the cascading water; blowing gas to be combusted to force the products of combustion to flow under pressure through the cascades; controlling the rate of passage of combustion products through the cascading water so as to maintain the water flowing to the pool slightly acidic and filtering the water prior to cascading thereof; and adding a chemical base to the pool water to control the acidity thereof.

These and other objects and advantages of the invention, as well as the details of illustrative embodiments, will be more fully understood from the following detailed description of the drawing, in which:

FIG. 1 is an elevation taken in section to show the overall water treating apparatus;

FIG. 2 is an enlarged plan view looking downward into the FIG. 1 container;

FIG. 3 is a section taken on line 3—3 of FIG. 1, and also showing installation in combination with a swimming pool;

FIG. 4 is an enlarged vertical section taken on line 4—4 of FIG. 1; and

FIGS. 5 and 6 are horizontal sections taken on lines 5—5 and 6—6 of FIG. 4.

Referring first to FIGS. 1 and 4, the basic heater apparatus 10 includes an upright container or shell 11 outside the pool water and having an inlet to receive a stream of pool water, together with interior baffles to drain and produce multiple cascades of falling water within the container. For example, the container inlet at 12 passes an inlet water pipe 13 into the container head 14, the pipe turning downwardly therein and terminating at a nozzle 15. The latter delivers water at low (atmospheric) pressure onto an upper spreader baffle 16 and a lower spreader baffle 17, a reduced orifice 18 passing water centrally to the baffle 17. From the baffles 16 and 17 the water spills in cascades 19 and 20 onto baffles 21 and 22, the former tapering downwardly and having an outlet at 1a for the cascades. Outlet 21a is directly above the downwardly tapering center baffle 22, the latter having an outlet at 23 to drain all the water onto a still lower central baffle 24, which is upwardly convex. Water draining off baffle 24 at cascade 25 falls onto a still lower baffle 26 which is downwardly tapering to pass water through an outlet 27.

The container also has a zone to receive a hot gaseous stream of combustion products including carbon dioxide, the zone and container having outlets to pass the exhaust stream causing it to rise in countercurrent contacting relation to the cascading water and in successive passes through the cascades, whereby the water becomes heated and also absorbs sufficient carbon dioxide for raising the relative acidity of the water to control algae growth in the pool. For example, the zone to receive hot combustion products is typically surrounded by, and defined at 28 by an upright tubular baffle 29 within the container and having an upwardly tapering section 30 forming an outlet 31. From the latter, the hot combustion products rise as indicated at 32 to pass through the water cascade 25. The combustion products then pass upwardly within the container space 33 to enter at 34 the baffle outlet 23 for contact with water cascading therein. In addition, the combustion products pass at 35 through the cascades 19 and 20, whereby an exceptionally complete countercurrent contacting relationship is established for causing absorption of carbon dioxide into the water. Finally, the combustion products rise at 36 through the container hood outlet 37 and into the atmosphere. Note the provision of gaps at 110 and 111 between the baffles 21 and 26 and wall 112 to pass a film of water down that wall of the container 11, for keeping the latter cool at all times. Also, the water films on the inner tubular baffle 29. As a result, hot surfaces are eliminated, and there is no need for insulation.

The container also has a water outlet indicated at 38 in FIG. 1 to pass heated water for return to the pool as via ducting 39. As better seen in FIG. 3, such ducting typically delivers water from the collection zone 40 within the container to the inlet of a scavenging pump 41. The latter is connected and operated to draw water from the collection zone 40 to prevent flooding of the container under all conditions, the pump delivering water via ducting 42 to the pool 43. Typically the pool may comprise a swimming pool having a shell or lining 44 which is subject to deterioration should the acidity of the water in the pool be too great. In accordance with the invention, the apparatus described above operates to cause the water withdrawn from the pool to absorb $CO_2$ and the water of combustion which is condensed, the heat of vaporization being recovered, and the apparatus operating normally in such relation to loss of carbon dioxide from the pool to the atmosphere as to maintain a desirably low level of acidity of water flowing to the pool, as for example around 6.8 pH. In the event such normal stability of the system should for any cause be disrupted, with result that the pool water acidity rises undesirably, an auxiliary additive such as soda ash may be added to the pool, this step being indicated at 45 in FIG. 3. In this regard, control of additive addition is indicated by the valve 46, and a pH meter is indicated at 47.

Returning to FIG. 1, the collection zone 40 is seen to be formed between the cylindrical container wall 11 and the cylindrical central baffle 29, a typical level of collected water being indicated at 48. In this regard, it will be understood that the pump 41 operates to prevent undesirable rising of the level 48 under all conditions, in the sense that an undesirable rise would too closely approach the level of outlet 31.

FIGS. 1 and 3 also illustrate the provision of a blower 50 connected to displace combustible gas into the container for combustion in zone 28, followed by pressurized flow of the exhaust gas stream upwardly and through the water cascades as previously described. The blower may typically take suction from a duct 51 having a controllable valve 52 connected in series therewith to control the rate of passage of products of combustion in such manner, for example, as to maintain the pool water slightly acidic. Thus, if the indicated acidity of the pool water is excessive, the valve 52 may be closed sufficiently to prevent that acidity. More specifically, the valve 52 controls the rate of combustion gas flow to the blower, the latter having vanes 53 and a discharge outlet at 54 to deliver combustible gas via line 55 to a burner 56 positioned within the lower interior of the container, as within the cylindrical baffle 29. The blower is motor-driven at 57 to drive the blower continuously, thereby to pressurize feed gas and the products of combustion creating an upward draft within the interior 28 of the baffle 29, the burner flames appearing at 58 and extending upwardly throughout the major length of the baffle zone 28. It will also be noted that the motor 57 drives the pump 41 which operates continuously to scavenge water from the collection space 40 within the container. Thus, the apparatus is well adapted for installation in series communication with existing swimming pool water circulation systems.

In regards to such installation, FIG. 3 shows a line 59 for withdrawing water from the pool 43 for feeding to a pump 60. The latter discharges to a filter 61 from which water passes at 13a for elevation and delivery to the apparatus seen in FIG. 1, as previously described. Accordingly, even though the valve 52 for feed gas may be closed, the system will operate to circulate water through the apparatus 10 for return to the pool. If that mode of operation is desired for any reason, the pool water may be suitably chlorinated. On the other hand, the amount of chlorine added to the pool water may be markedly reduced or eliminated by operating the apparatus with products of combustion being fed thereto as previously described, in order to introduce carbon dioxide to the pool water in the form of carbonic acid. In this regard, the setting of the valve 52 may be adjusted to achieve a stabilization of pool water acidity, i.e. about 6.8 pH to prevent algae growth. At the same time, the temperature of the pool water may be kept at a comfortable level by operation of the apparatus 10.

Finally, FIGS. 4 through 6 show support plates 70, 71 and 72 extending in vertical radial planes for supporting the various baffles, as indicated. The support plates are appropriately stacked within the cylindrical container 11 and connected thereto. A housing 73 is shown in FIG. 1 as enclosing the blower pump and motor elements, the latter being carried on a base 74. FIG. 2 shows the provision of a plate 75 extending across the upper interior of the container 11, and provided with openings 76 through which the products of combustion pass when escaping from the apparatus. The assembly of the plate to the container is better seen in FIG. 4.

Other applications of the invention include use in heating water for automatic car washes, or other environments requiring large amounts of warm soft water.

I claim:

1. In combination with a pool of water, an upright container outside the pool water and having an inlet to receive a stream of pool water and interior baffles to drain and produce multiple cascades of falling water within the container, one of said baffles being upright and surrounding and defining a zone to receive a hot gaseous stream of combustion products including carbon dioxide and water of combustion, a gas burner located to feed gas for combustion with air to produce said stream rising in said zone, the zone and container having outlets to pass the exhaust gas stream so that the stream rises in countercurrent contacting relation to the cascading water and in successive passes through the cascades whereby the water becomes heated and also absorbs carbon dioxide for raising the relative acidity of the water, the container also having a water outlet to pass heated water for return to the pool, and ducting connected to pass pool water to the container inlet and to return water from said water outlet to the pool.

2. The combination of claim 1 in which water is supplied in such relation to the container and baffles that said water films on the inner surface of the container and on said one baffle for cooling same.

3. The combination of claim 1, including a blower connected to displace combustible gas into the container for combustion in said zone and pressurized flow of the exhaust gas stream through said cascades.

4. The combination of claim 3, in which said one baffle is tubular, other baffles having staggered extents vertically above the level of said zone outlet to produce multiple cascades in the path of lateral and upward flow of exhaust gas.

5. The combination of claim 4, in which the container and tubular baffle form a collection zone in which cascading water collects, and including a scavenging pump connected to draw water from said collection zone via said container water outlet for return to the pool water.

6. The combination of claim 5, including a prime mover connected to drive said blower and said pump continuously thereby to prevent flooding of the container, and a control to meter gas delivery to said gas receiving zone.

7. The method of treating swimming pool water, that includes withdrawing water from the pool, cascading the withdrawn water in a region outside the pool, passing hot gaseous products of combustion through the cascading water in said region to dissolve $CO_2$ from said products in the water, forming a gravitating water partition isolating said region, and returning the $CO_2$ container water to the pool.

8. The method of claim 7, including the step of adding a base to the swimming pool water when the level of $CO_2$ content of the water results in excessive acidity thereof.

9. The method of claim 7 including the step of combusting a combustible to produce said products of combustion at elevated temperature to be passed through the cascading water for heating the water.

10. The method of claim 9 including the step of blowing gas to be combusted to force the products of combustion to flow under pressure through said cascades.

11. The method of claim 10, including the step of controlling the rate of said passage of products of combustion so as to maintain the pool water slightly acidic, and filtering said withdrawn water prior to said cascading step.

References Cited

UNITED STATES PATENTS

| | | | |
|---|---|---|---|
| 1,964,487 | 6/1934 | Smith | 210—61 |
| 2,597,192 | 5/1952 | Schneible | 261—112 |
| 2,661,333 | 12/1953 | Schein | 210—62 X |
| 2,781,635 | 2/1957 | Brogdon. | |
| 2,889,002 | 6/1959 | Kocee | 261—112 X |
| 2,921,004 | 1/1960 | Wood | 159—4 X |
| 2,937,013 | 5/1960 | Fisher | 159—4 X |
| 3,072,134 | 1/1963 | Williamson | 210—169 X |
| 3,251,357 | 5/1966 | Williamson | 210—64 X |
| 704,043 | 7/1902 | Humphrey | 126—359 |
| 759,607 | 5/1904 | Hallas et al. | 126—359 |

MICHAEL E. ROGERS, *Primary Examiner.*

U.S. Cl. X.R.

210—61, 64, 192, 169; 126—359; 261—112